(12) United States Patent
Schöb (10) Patent No.: US 6,365,996 B2
(45) Date of Patent: *Apr. 2, 2002

(54) RADIAL ACTIVE MAGNETIC BEARING APPARATUS AND A METHOD FOR OPERATING THE SAME

(75) Inventor: Reto Schöb, Volketswil (CH)

(73) Assignee: Lust Antriebstechnik GmbH, Lahnau (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,604
(22) PCT Filed: Aug. 19, 1996
(86) PCT No.: PCT/CH96/00287
§ 371 Date: Feb. 10, 1998
§ 102(e) Date: Feb. 10, 1998
(87) PCT Pub. No.: WO97/07341
PCT Pub. Date: Feb. 27, 1997

(30) Foreign Application Priority Data

Aug. 18, 1995 (CH) .............................................. 02367/95
Jul. 30, 1996 (EP) ............................................ 96810507

(51) Int. Cl.⁷ ............................................... F16C 39/06
(52) U.S. Cl. ...................................................... 310/90.5
(58) Field of Search ........................................ 310/90.5

(56) References Cited

U.S. PATENT DOCUMENTS 4,794,290 A * 12/1988 Nagasaka .................. 310/90.5
5,053,662 A * 10/1991 Richter ...................... 310/90.5
5,300,843 A * 4/1994 Lyons et al. ............... 310/90.5
5,578,880 A * 11/1996 Lyons et al. ............... 310/90.5

FOREIGN PATENT DOCUMENTS

| DE | 23 53 342 | 5/1978 |
| EP | 0 054 617 A1 | 6/1982 |
| EP | 0 311 122 A1 | 4/1989 |
| WO | WO 90/14525 | 11/1990 |

OTHER PUBLICATIONS

Bichsel, Jürg, "Der lagerlose Elektromotor", *Technische Rundschau* 85 Sep. 3, 1993., No. 35, Bern, CH; pp. 60–66.

* cited by examiner

Primary Examiner—Burton S. Mullins
(74) Attorney, Agent, or Firm—Townsend and Townsend and Crew LLP (57) ABSTRACT

A radial, active magnetic bearing apparatus comprising at least three electromagnets which are distributedly arranged is excited by a three-phase rotary current controller.

9 Claims, 12 Drawing Sheets

RADIAL ACTIVE MAGNETIC BEARING APPARATUS AND A METHOD FOR OPERATING THE SAME

BACKGROUND OF THE INVENTION

1. Field of the Invention

The invention relates to a radial, active magnetic bearing apparatus comprising at least three electromagnets that are distributedly arranged in the bearing wherein a rotary current controller is provided for the excitation of the coils of the electromagnets.

2. Description of the Prior Art

A radial, active magnetic bearing for the contact-free journalling of a rotatable body is known from EP 0 612 928. A magnetic bearing of this kind comprises in each case three electromagnets respectively mutually displaced by 120° in the circumferential direction, with each of the three electromagnets being supplied with electrical energy by a separate amplifier. A disadvantage of this known magnetic bearing is to be seen in the fact that three separate power amplifiers are required, which are in addition specifically matched and are therefore relatively expensive.

SUMMARY OF THE INVENTION

The object of the present invention is to provide an economically more advantageous, active magnetic bearing apparatus.

A radial, active magnetic bearing uses the so-called Maxwell force in order to maintain a rotating part in suspension without contact. This Maxwell force is the reason for the force of attraction of magnetically conducting bodies which are located in a magnetic field.

The object of proposing an economically more advantageous radial, active magnetic bearing based on the Maxwell force is satisfied, in particular, wherein at least three electromagnets are distributedly arranged in the bearing; and wherein a rotary current controller is provided for the excitation of the coils of the electromagnets.

An advantage of the invention is to be seen in the fact that a conventional, three-phase rotary current controller or a three-phase converter can be used as a rotary current controller. These rotary current controllers are a standard product for the excitation of electrical machines. For this reason, a rotary current controller of this kind can be obtained at a very favorable cost.

A further advantage is to be seen in the fact that a conventional three-phase rotary current controller usually has an integrated micro-controller which can be used for control tasks. To use the rotary current controller as an excitation device for an active magnetic bearing, a correspondingly adapted control procedure is required which usually can be stored in the micro-controller of the rotary current controller in the form of program lines (software). Thus, the signal processing, which is complicated and expensive per se, can largely be carried out by the micro-controller integrated into the rotary current controller, which saves on the costs for an additional signal processing apparatus.

The active magnetic bearing in accordance with the invention can be designed as an inner rotor, i.e. with a rotor disposed inwardly, or as an outer rotor, i.e. with a rotor surrounding the electromagnets outwardly. The active magnetic bearing requires a bias magnetization which can be produced by a permanent magnet or by a coil with a direct current component.

BRIEF DESCRIPTION OF THE DRAWINGS

FIG. 7b is an electrical circuit for the excitation of the magnetic bearing in accordance with FIG. 7a;

FIG. 8c is an electrical circuit for the excitation of the magnetic bearing in accordance with FIG. 8a.

DETAILED DESCRIPTION OF THE PREFERRED EXEMPLARY EMBODIMENTS

Figure 1A:
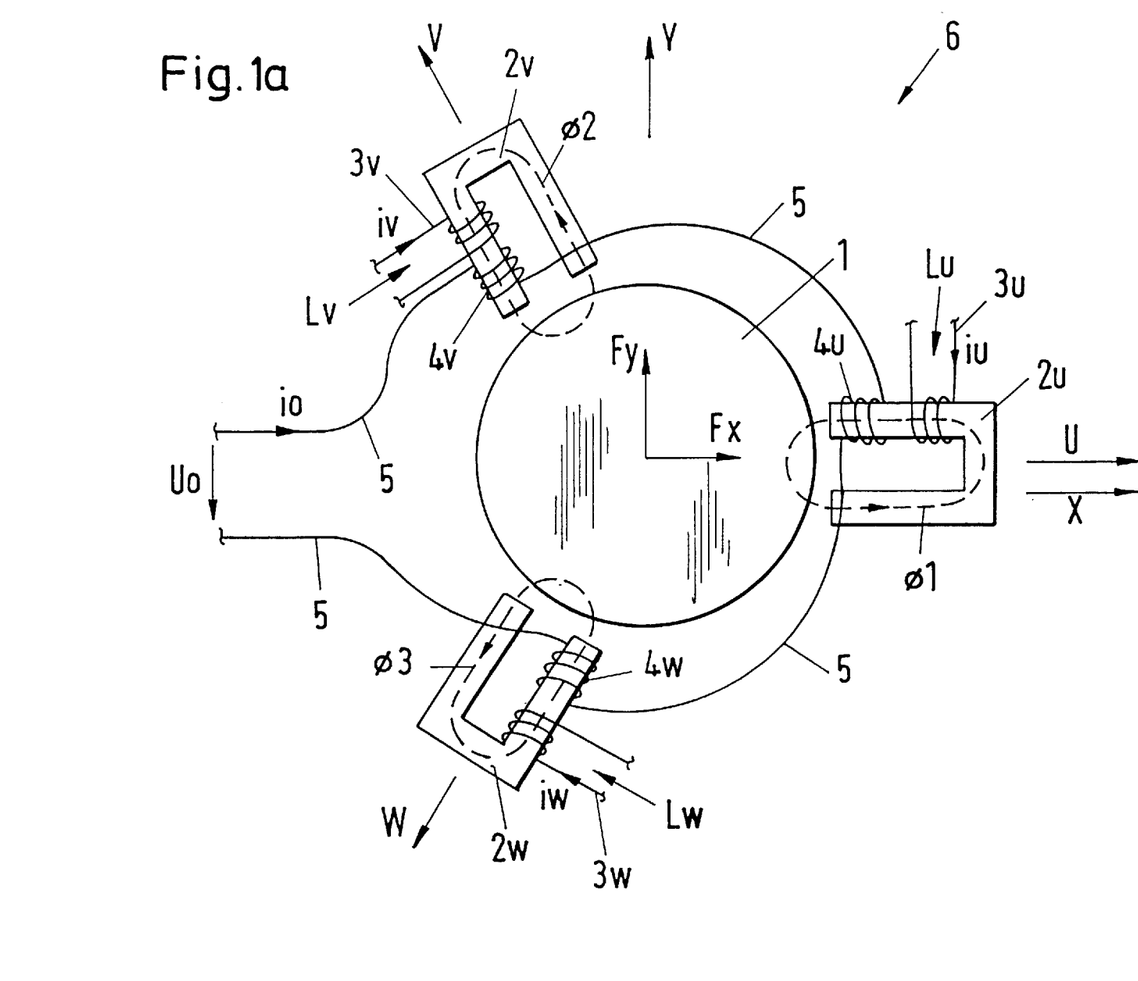
FIG. 1a is a side view of a magnetic bearing with three electromagnets.

FIG. 1a shows a side view of an exemplary embodiment of a radial, active magnetic bearing. The rotor 1, which is designed as a shaft, is held in suspension without contact by three electromagnets 2u, 2v, 2w which are designed to be discrete and u-shaped and are respectively mutually displaced by 120° in the peripheral direction in each case. Each electromagnet 2u, 2v, 2w has a coil Lu, Lv, Lw for the production of a magnetic flux φ1, φ2, φ3 which is variable in time. Each coil Lu, Lv, Lw is connected to a non-illustrated rotary current source 10 via electrical conduction lines 3u, 3v, 3w. The magnetic bearing requires a bias magnetization, which in the present exemplary embodiment is produced by three coils 4u, 4v, 4w through which a direct current flows. At each coil core 2u, 2v, 2w there is provided a coil 4u, 4v, 4w which is wound in the same direction. The coils 4u, 4v, 4w are connected to one another in a series circuit via an electrical conductor 5 and are thus flowed through by a common direct current io. Further illustrated are the horizontal X-direction and the vertical Y-direction of the bearing as well as the forces Fx and Fy acting on the shaft 1. The individual electromagnets 2u, 2v, 2w are respectively mutually displaced by 120° in each case with a direction of extent u, v, w in the peripheral direction of the shaft 1.

Figure 1B:
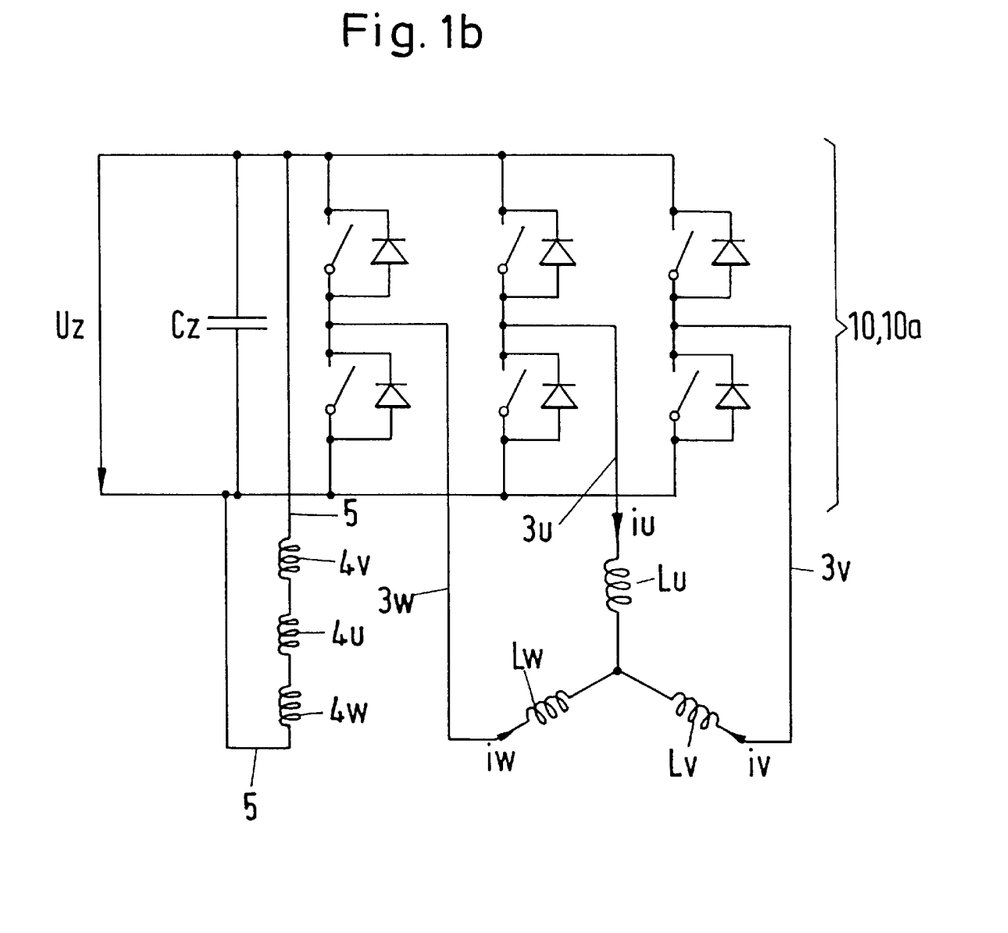
FIG. 1b is an electrical circuit with a three-phase rotary current controller for the excitation of the magnetic bearing comprising three electromagnets.

FIG. 1b shows the electrical connection of a three-phase rotary current controller 10 to the coils Lu, Lv, Lw of the radial, active magnetic bearing of FIG. 1a. The rotary current controller 10 is operated with an intermediate circuit voltage Uz and has a condenser Cz. The rotary current controller 10 comprises a power part 10a and a non-illustrated signal transmission device 10b which comprises a micro-controller. The three coils Lu, Lv, Lw are connected to one another in a star circuit, with the three phase currents iu, iv, iw being supplied to the coils Lu, Lv, Lw via the electrical conductors 3u, 3v, 3w of the power part 10a of the rotary current controller 10. The three coils Lu, Lv, Lw could also be connected to the rotary current controller 10 in a triangular or delta circuit. The power part has three bridge branches each of which is connected to an electrical conductor 3u, 3v, 3w. In the illustrated embodiment, the three coils 4u, 4v, 4w which produce a bias magnetization are connected via the electrical conductor 5 in a series circuit to the intermediate circuit voltage Uz so that all coils 4u, 4v, 4w are flowed through by a common current io.

The relationship between the forces Fx and Fy acting on the rotor 1 and the currents iu, iv, iw present at the coils Lu, Lv, Lw is as follows:

In the following equations k represents a proportionality constant.

For the force Fx one has:

$$F_x = 2(i_u + i_o)k \cos(30°) - (i_v + i_o)k \cos(30°) - (i_w + i_o)k \cos(30°)$$

and, on collecting terms:

$$F_x = k\sqrt{3}(i_u - \tfrac{1}{2}i_v - \tfrac{1}{2}i_w)$$

For the force $F_y$ one has:

$$F_y = (i_v + i_o)k + (i_v + i_o)k \sin((30°) + (iu+io)k \sin(30°) - (ic+io)k - (ic+io)k \sin(30°) - (ia+io)k \sin(30°)$$

and on collecting terms:

$$F_y = k\sqrt{\sqrt{3}}(\sqrt{3}/2 i_v - \sqrt{3}/2 i_w)$$

For a three-phase rotary current controller 10 the auxiliary condition always holds that the sum of all currents is equal to zero. Therefore, the additional relationship holds:

$$i_u + i_v + i_w = 0$$

Thus, in the use of a three-phase rotary current controller (equation III) for the excitation of an active, magnetic bearing the following relationship results between the currents iu, iv, iw of the individual coils Lu, Lv, Lw and the force Fx, Fy acting on the shaft 1:

$$\begin{bmatrix} i_u \\ i_v \\ i_w \end{bmatrix} = \frac{2}{3\sqrt{3}k} \cdot \begin{bmatrix} 1 & 0 \\ -1^{1/2} & \sqrt{3/2} \\ -1^{1/2} & -\sqrt{3/2} \end{bmatrix} \cdot \begin{bmatrix} Fx \\ Fy \end{bmatrix} \quad \text{(IV)}$$

It can be seen from equation IV that in the use of a conventional, three-phase rotary current controller the forces Fx and Fy acting on the shaft 1 can be controlled. The two components of the force Fx, Fy are orthogonal to one another so that a force acting on the shaft 1 in any desired radial direction can be produced using these two components. Thus, a total flux is produced in the magnetic bearing by the superposition of a rotary field flux on a direct current flux which enables a force acting in any desired radial direction to be produced. In this equation, the condition that the sum of the currents iu, iv, iw is zero is satisfied, so that a three-phase rotary current controller can be used.

The bias magnetization current io cancels out of the equations I and IV and need therefore no longer be taken into consideration in the regulation of the currents iu, iv, iw. The bias magnetization current io is advantageously chosen such that this current io produces about one half of the saturation flux density of the coil cores 2u, 2v, 2w.

Figure 3:
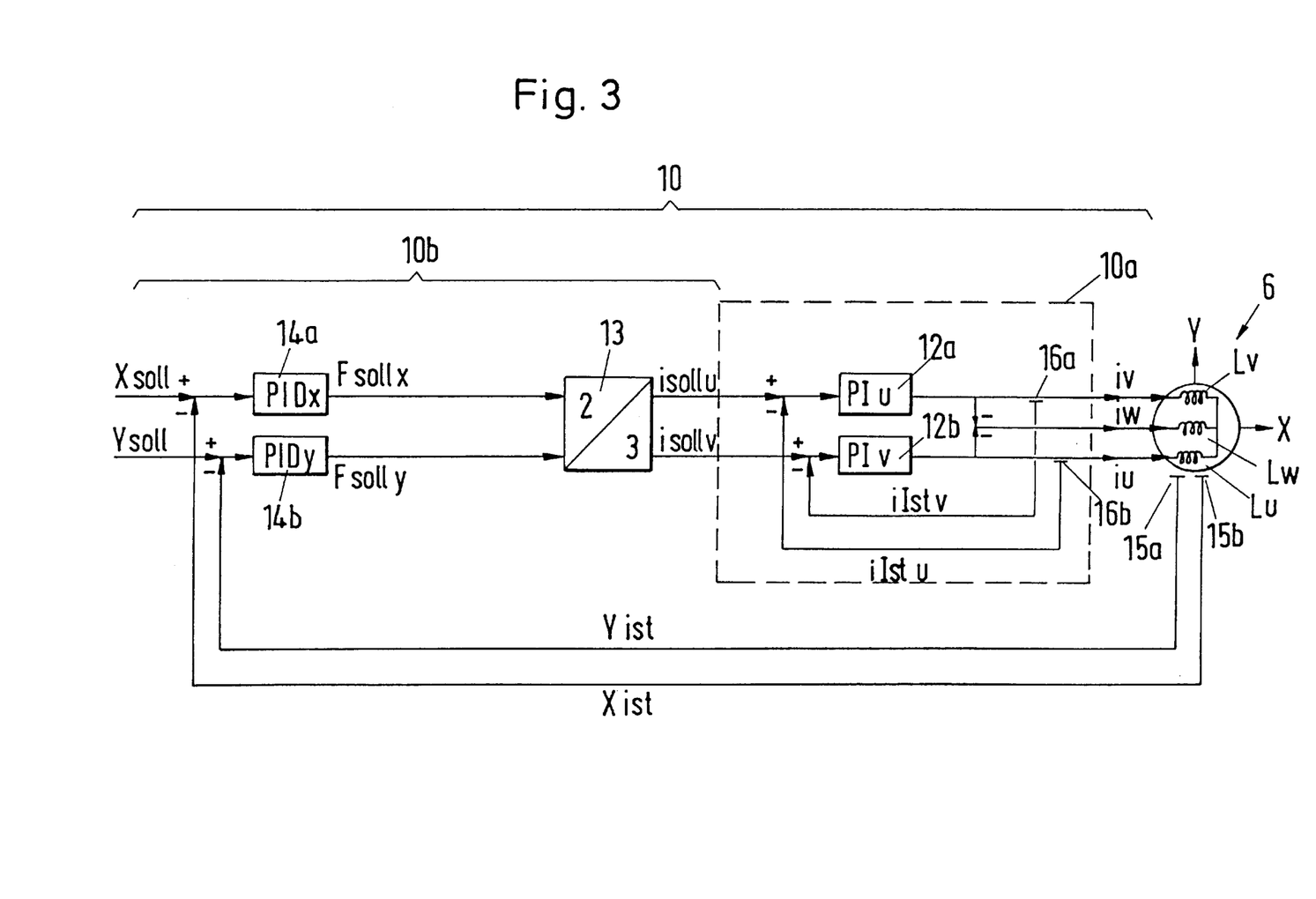
FIG. 3 is a control apparatus for the excitation of the magnetic bearing which is arranged in the rotary current controller.

FIG. 3 shows a three-phase rotary current controller 10 which comprises a three-phase power part 10a and further an electronic component 10b forming a control circuit. The rotary current controller 10 comprises, in particular, a programmable microprocessor which enables the respective required regulation to be programmed by a corresponding software.

The exemplary embodiment of a rotary current controller 10 illustrated in FIG. 3 has a regulator structure for the excitation of the active magnetic bearing 6 illustrated in the FIGS. 1a and 1b. The bias magnetization current io is of subordinate importance and hence not illustrated. The three coils Lu, Lv, Lw of the magnetic bearing 6 are supplied with the currents iu, iv, iw by the power part 10a. Two position sensors 15a, 15b arranged on the magnetic bearing 6 measure the respective position of the rotor 1 in the X and Y direction and produce a corresponding position signal Xist, Yist, which is fed to a comparator device. This comparator device determines the deviation between a predetermined desired value Xsoll, Ysoll and the measured actual value Xist, Yist and feeds the difference signal to a position regulator 14a, 14b which is designed as a PID regulator. The two position regulators 14a, 14b calculate the force components Fsollx, Fsolly which are required in the X and Y direction and are to be exerted on the rotor 1 in order to bring the actual value Xist, Yist into agreement with the predetermined desired value Xsoll, Ysoll. The force components Fsollx, Fsolly are fed to a 2/3-phase transformation apparatus 13 which calculates the required desired current values isollu, isollv using equation IV. Only two desired current values are to be preset for the power part 10a since the third current value is already determined by the condition that the sum of all currents is equal to zero. Current sensors 16a, 16b monitor the actual current values iistu, iistv, which are compared with the desired values isollu, isollv, and the difference values are fed to the current regulators 12a, 12b which are designed as PI regulators and thereupon produce the currents iu, iv via current controllers. Thus, an active, magnetic bearing can be operated in a simple and economical manner with a three-phase rotary current controller 10.

Figure 1C:
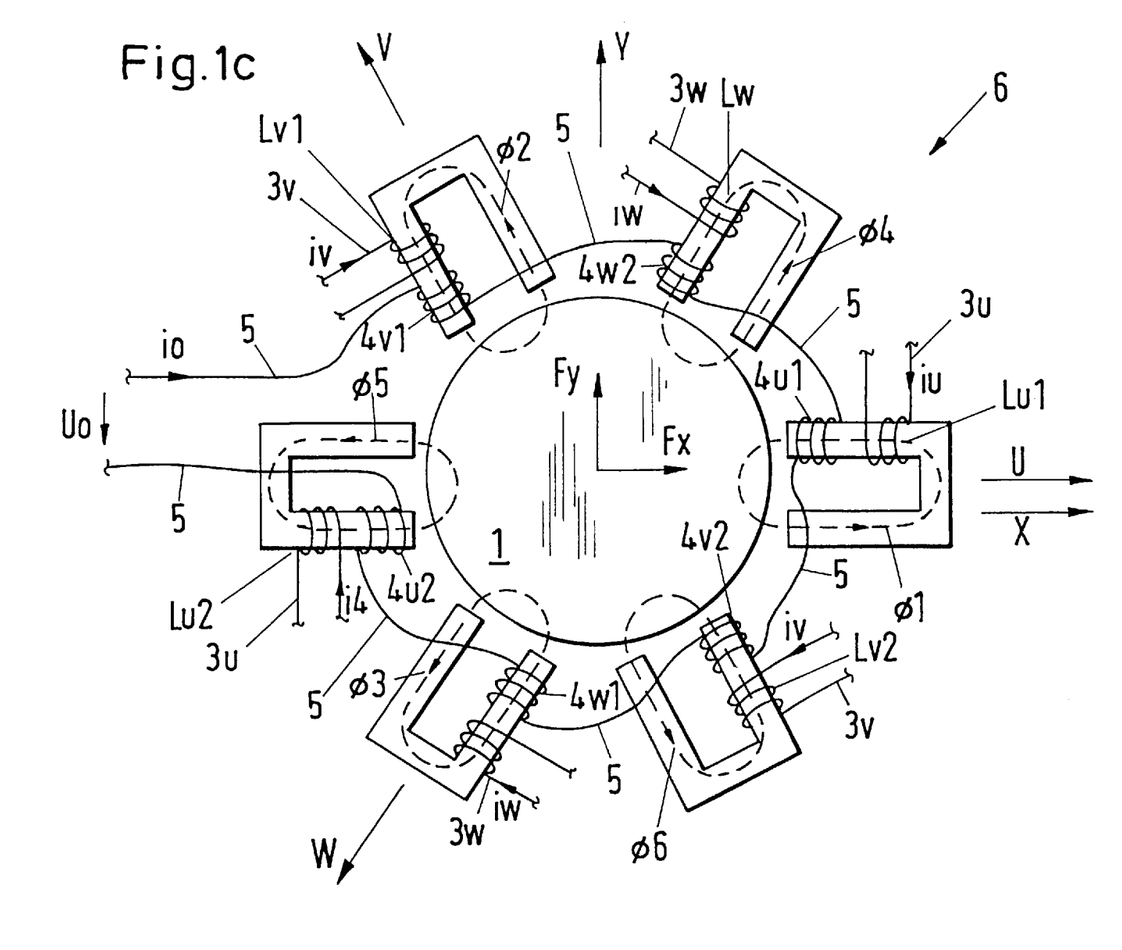
FIG. 1c is a side view of a magnetic bearing with six electromagnets.
Figure 1D:
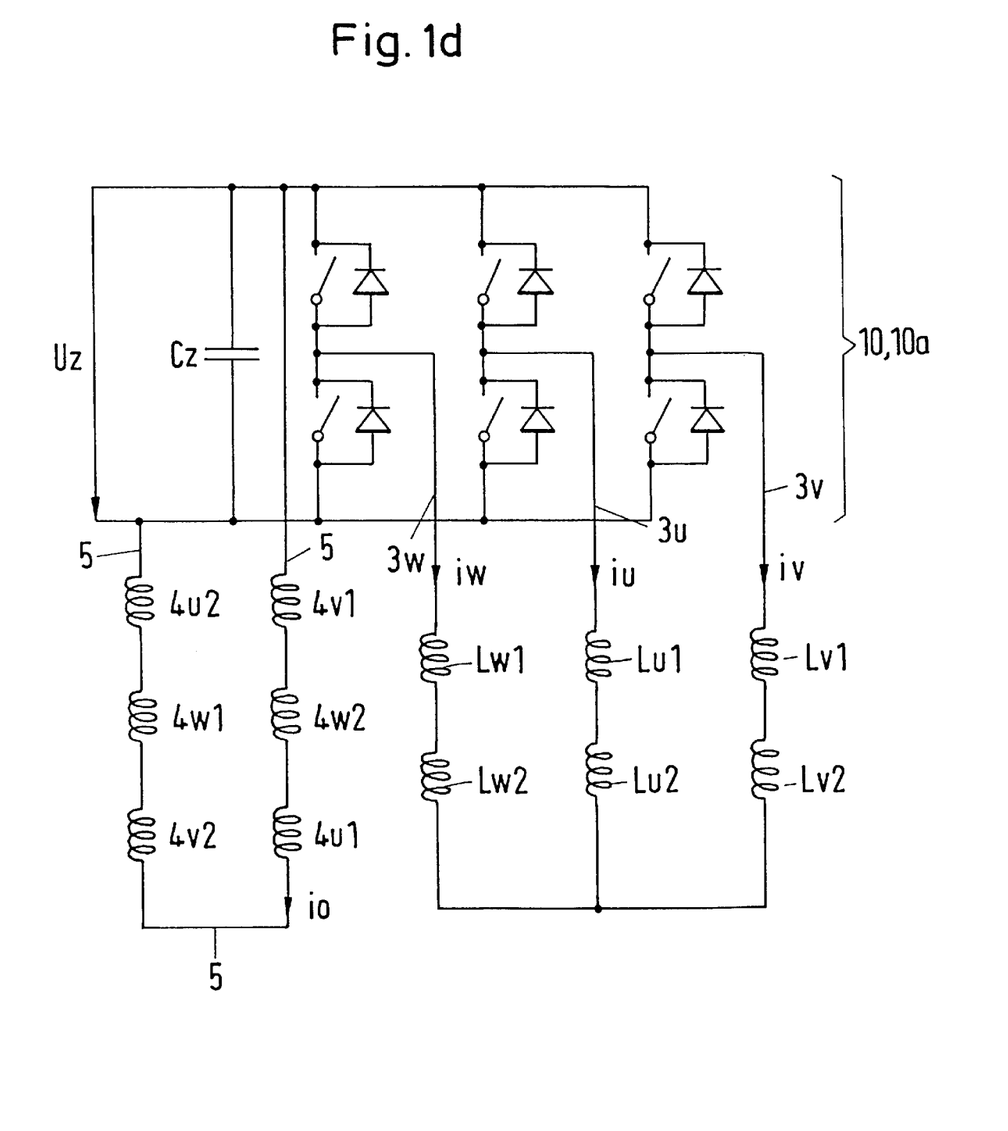
FIG. 1d is an electrical circuit with a three-phase rotary current controller for the excitation of the magnetic bearing comprising six electromagnets.

FIG. 1c shows a side view of an exemplary embodiment of a radial, active magnetic bearing which, otherwise similar to the embodiment of FIG. 1a, has six electromagnets mutually respectively displaced in the peripheral direction by 60° each. As can be seen from the electrical circuit of FIG. 1d, the coils Lu, Lv, Lw are connected in series and flowed through by the same current iu. The same holds for the coils Lw1, Lw2 and the coils Lv1, Lv2, which are connected in series and are each flowed through by a common current iv or iw. The coils 4v1, 4w2, 4u1, 4v2, 4w1, and 4u2 are connected in series via a common electrical conductor 5 to the intermediate circuit voltage Uz for the bias magnetization, and are thus flowed through by a common current io. In the individual electromagnets, which are discrete and designed in u-shape, a corresponding, temporally variable magnetic flux φ1, φ2, φ3, φ4, φ5, φ6 is produced.

Figure 2A:
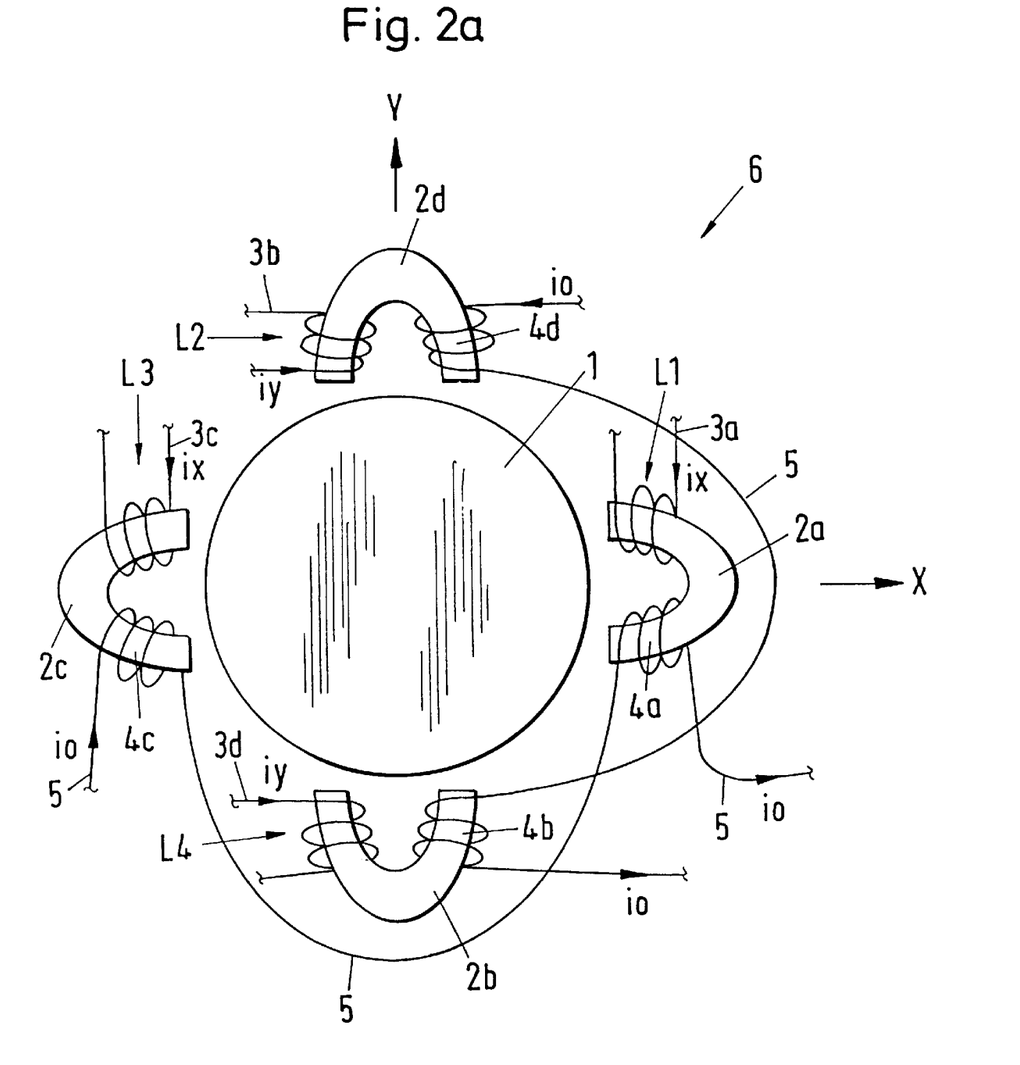
FIG. 2a is a side view of a magnetic bearing with four electromagnets.

FIG. 2a shows a side view of a further exemplary embodiment of a magnetic bearing 6 with four u-shaped and discretely designed electromagnets 2a, 2b, 2c, 2d arranged to be mutually displaced in the peripheral direction by 90°.

Figure 2B:
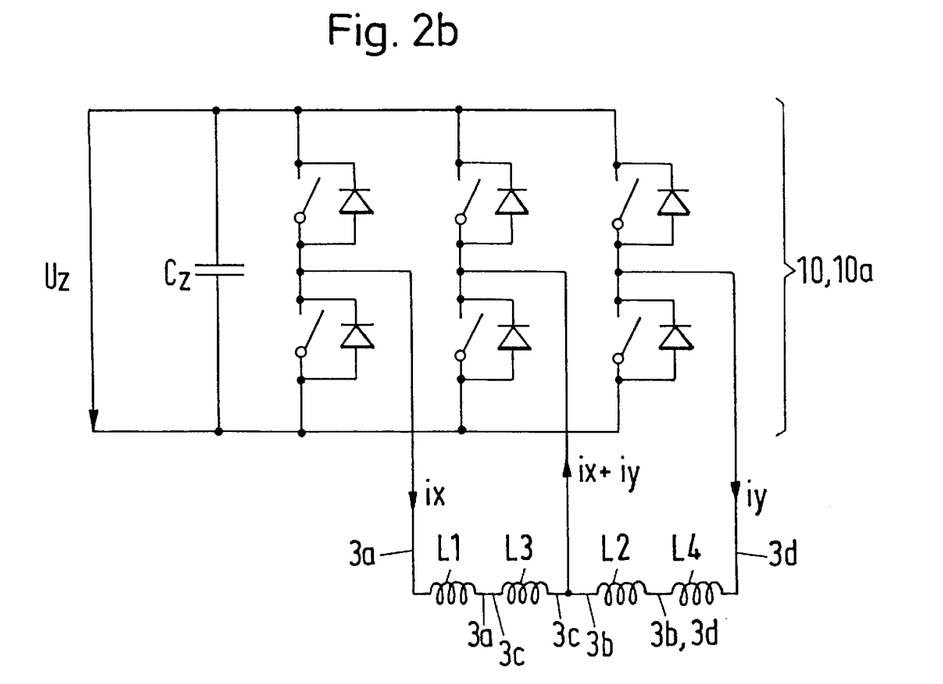
FIG. 2b is an electrical circuit with a three-phase rotary current controller for the excitation of the bearing comprising four electromagnets.

Each electromagnet has a coil L1, L2, L3, L4 with electric conductors 3a, 3b, 3c, 3d which, as illustrated in FIG. 2b, are connected to the three-phase rotary current controller 10. In this situation, the two coils L1 and L3 are connected in series and are flowed through by the common current ix. The two coils L2 and L4 are likewise connected in series and are flowed through by the common current iy. The third branch of the rotary current controller 10 is flowed through by the sum of the currents ix+iy. This arrangement enables the excitation of four electromagnets by a three-phase rotary current controller 10, with it being necessary to take care that the sum of the currents ix+iy does not exceed the maximum permissible current of the rotary current controller 10. The arrangement of FIGS. 2a, 2b can likewise be operated with the control apparatus 10b integrated in the rotary current controller 10, with the 2/3-phase transformation 13 being designed to be adapted corresponding to the four electromagnets present in order to calculate the desired values for the currents ix and iy. In the exemplary embodiment of FIG. 2b, the feeding of the coils 4a, 4b, 4c, 4d for the production of a bias magnetization is not carried out via the intermediate circuit voltage Uz of the rotary current controller 10, but rather via an additional non-illustrated excitation apparatus.

Figure 4:
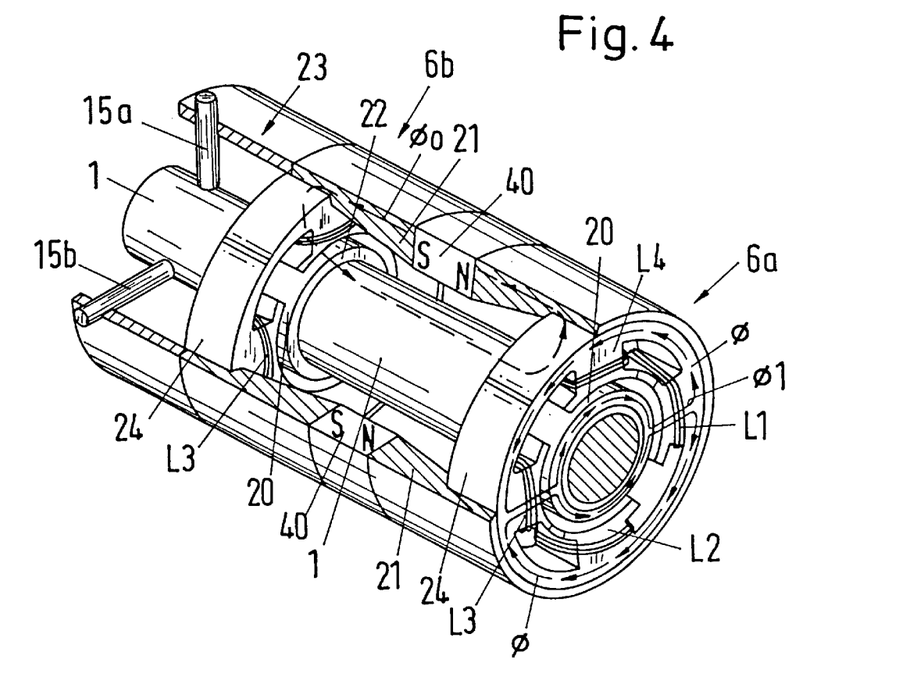
FIG. 4 is a further exemplary embodiment of a magnetic bearing with four coils.

FIG. 4 shows a further exemplary embodiment of a magnetic bearing with two active magnetic bearings 6a, 6b which are arranged to be axially spaced and which are both excited by a three-phase rotary current controller 10 in each case. Contrary to the previously illustrated embodiments, the bearing 6a does not have individually arranged electromagnets. The bearing 6a has a through-going, ring-shaped body 24 with four coil cores extending in the radial direction on which the coils L1, L2, L3, L4 are arranged. Thus, for example, the magnetic flux φ1 produced by the coil L1 flows via the ring-shaped stator 24 and through the coil L3, and via the air gap 20 and the rotor 1 back to the coil L1. The two bearings 6a, 6b are coupled to one another via the metallic housing 21 while forming a unipolar bearing. A permanent magnet 40 is arranged in the housing 21 which surrounds the rotor 1 in the peripheral direction and produces a constant direct current flux φo or a unipolar flux which passes via the bearing 6b, the rotor 1, the bearing 6a and the housing 21. The housing 21 has a projecting part 23 for holding the position sensors 15a, 15b. The coils L1, L2, L3, L4 of each bearing 6a, 6b can be connected to a three-phase rotary current controller 10 as in the arrangement illustrated in FIG. 2b. The two required rotary current controllers 10 are actuated by a higher level actuation apparatus in order to operate the entire unipolar bearing illustrated in FIG. 4.

Figure 5:
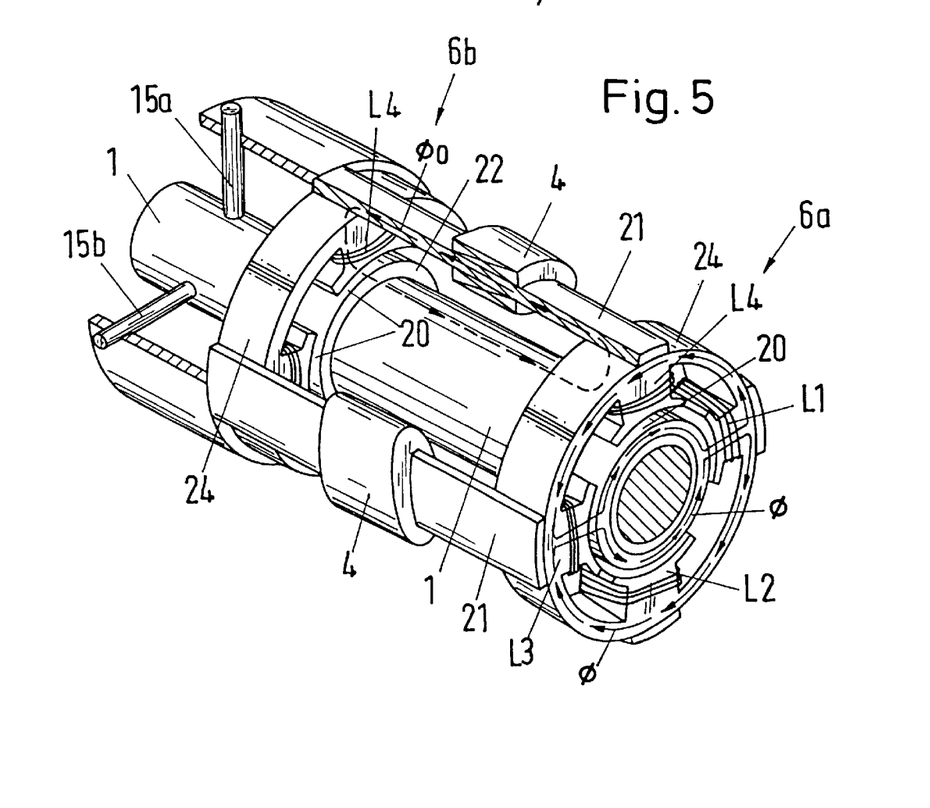
FIG. 5 is a further exemplary embodiment of a magnetic bearing with four coils.

FIG. 5 shows a unipolar bearing which is designed very similarly to the exemplary embodiment of FIG. 4 and comprises two radial, active magnetic bearings 6a, 6b. Two electromagnets 4 which are operated with a direct current io are arranged in the place of the permanent magnet 40 and are coupled via magnetically conducting webs 21 to the body 24 which extends in the shape of a ring so that a constant direct current flux φo or unipolar flux again arises.

Figure 6:
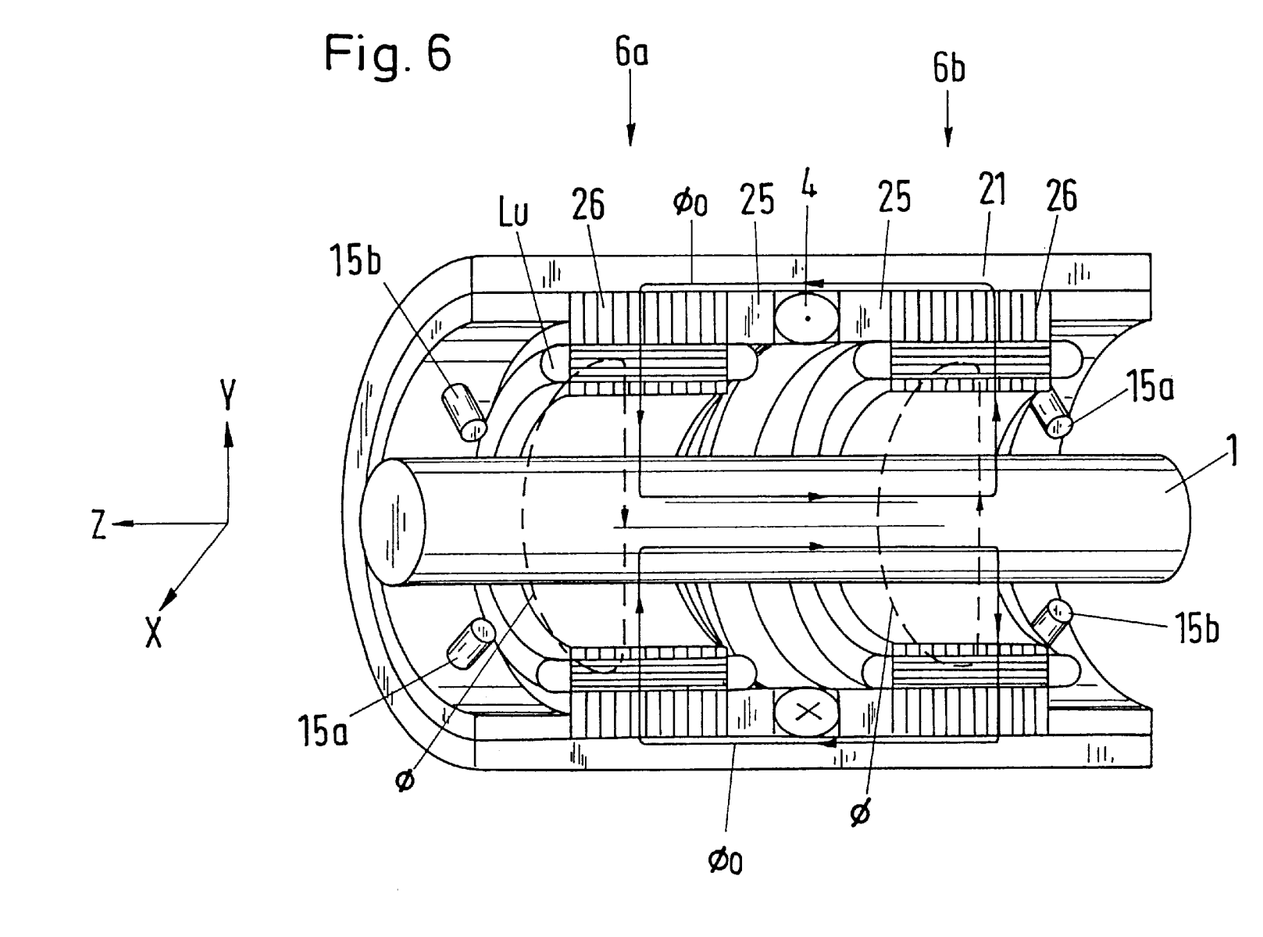
FIG. 6 is a magnetic bearing with three coils designed as a rotary current winding.

FIG. 6 shows a further unipolar bearing with two radial, active magnetic bearings 6a, 6b arranged with a spacing in the axial direction with respect to the shaft 1. Both bearings 6a, 6b are designed as rotary field machine stators 26 and have three-phase windings Lu, Lv, Lw correspondingly distributed around the periphery. The constant direct current flux φo is produced via a direct current coil 4 surrounding the shaft 1 in the peripheral direction which is coupled via flux conduction rings 25 to the rotary field machine stators 26. The three-phase windings Lu, Lv, Lw produce a magnetic flux φ in the bearings 6a, 6b, The position of the rotor 1 is measured by sensors 15a, 15b. The three coils Lu, Lv, Lw of each bearing 6a, 6b are connected to one three-phase rotary current controller 10 each in the same manner as is illustrated in FIG. 1b. A higher level actuation apparatus regulates both rotary current controllers 10 as well as the direct current io flowing in the coil 4.

Figure 6A:
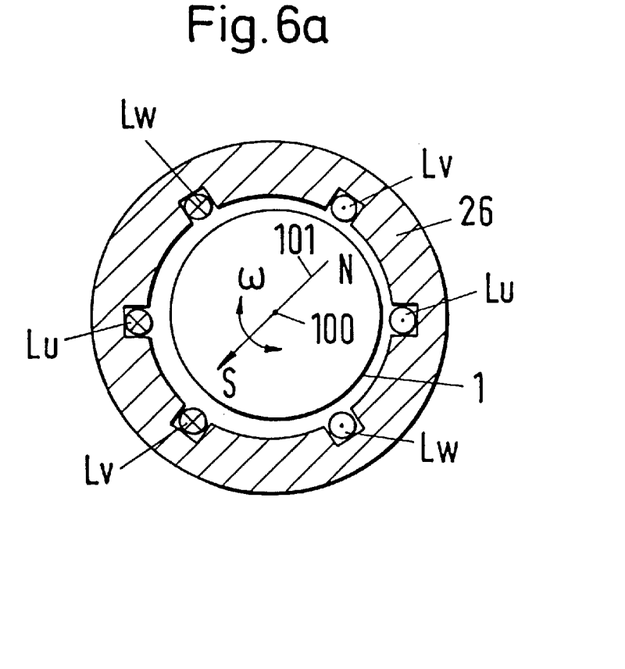
FIG. 6a is a cross-section through a bearing in accordance with FIG. 6.

FIG. 6a shows a simplified cross-section through the rotary field machine stator 26 of FIG. 6. The rotary field machine stator 26 has three coils Lu, Lv, Lw which extend in the axial direction and which are arranged to be displaced in the peripheral direction of the rotary field machine stator 26. These coils Lu, Lv, Lw are only symbolically illustrated and usually have a plurality of individual electrical conductors which are additionally arranged in the peripheral direction of the rotary field machine stator 26. The coils Lu, Lv, Lw are arranged in the rotary field machine stator 26 in such a manner, and are excited by the three-phase rotary current controller 10 in such a manner that a bipolar magnetic field 101 is produced which extends in the radial direction in the rotary field machine stator 26 and which is rotatable in the direction ω about the midpoint 100 of the rotor 1. The coils Lu, Lv, Lw can be excited in such a manner that either a rotating magnetic field 101 is produced or, at an excitation frequency of zero, a stationary magnetic field 101 is produced, with the magnitude and the direction of the stationary field 101 being freely predeterminable by the excitation of the coils Lu, Lv, Lw. Thus, with the help of a rotary current controller 10, a magnetic field 101 which extends in a predeterminable direction and has a predeterminable magnitude can be produced in the rotary field machine stator 26 or also in one of the other magnetic bearings 6.

Figure 7A:
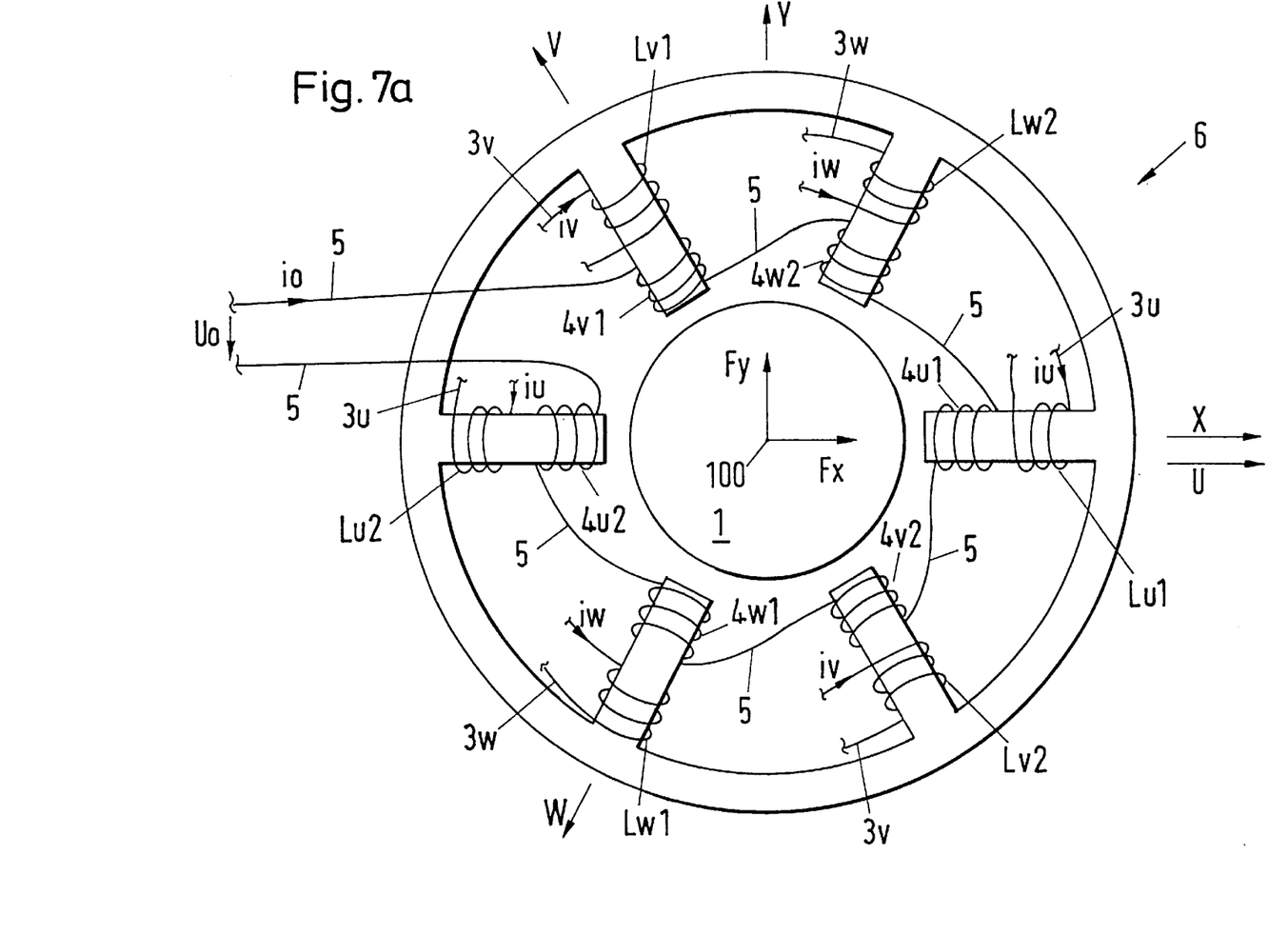
FIG. 7a is a further exemplary embodiment of a magnetic bearing.
Figure 7B:
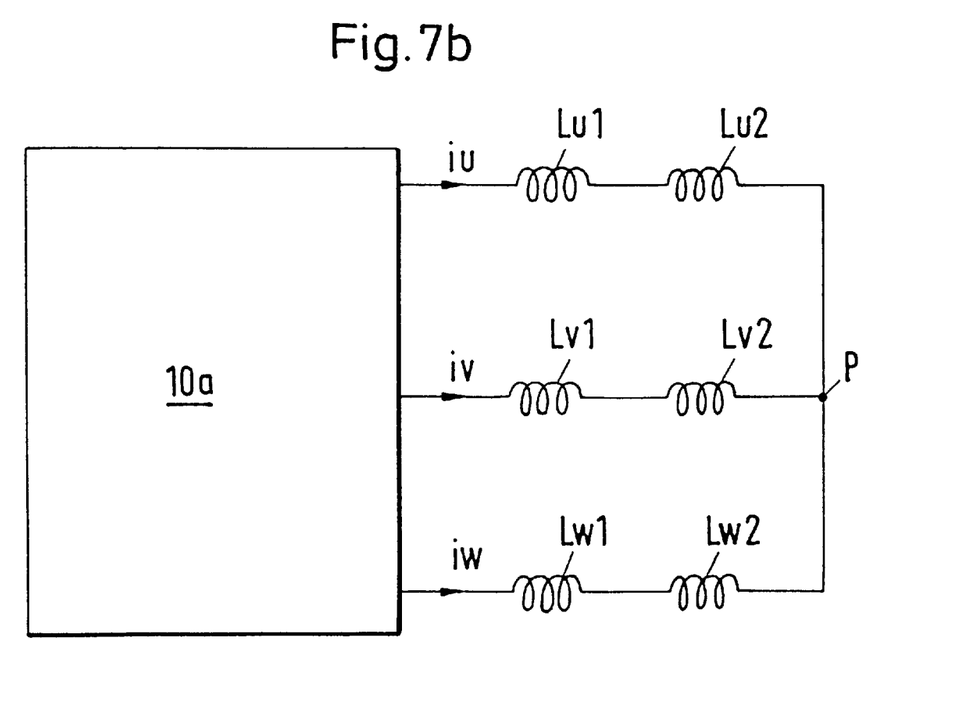

FIG. 7a shows a further exemplary embodiment of a radial, active magnetic bearing apparatus 6. The rotor 1 is held in suspension without contact by six discretely designed electromagnets with coils Lu1, Lu2, Lv1, Lv2, Lw1, Lw2 which are mutually respectively displaced by 60° in the peripheral direction. Each tooth-shaped electromagnet has, in addition, a coil 4u1, 4u2, 4v1, 4v2, 4w1, 4w2, connected in series via an electrical conductor 5 and, excited by a d.c. voltage source Uo, are flowed through by a direct current io. This direct current io produces a bias magnetization in the bearing 6. FIG. 7b shows the electrical connection of the coils Lu1, Lu2, Lv1, Lv2, Lw1, Lw2 to the power part 10a of the rotary current controller 10. Coils Lu1, Lu2, Lv1, Lv2, Lw1, Lw2, which are oppositely disposed in the radial direction, are connected in series, with these series connections being connected to one another in a star circuit at the star point P. These series connections can also be connected to one another in a triangular or delta circuit.

The unipolar bearings illustrated in FIGS. 4 to 6 can also be operated with a single rotary current controller 10 only. This exemplary embodiment will be described in detail with the help of the bearing in accordance with FIG. 4. The coil L3 of the bearing 6a and the coil L3 of the bearing 6b are each arranged to be wound in contrary senses on the ring-shaped bodies 24. These two coils L3 are connected in series and are thus flowed through by the same current. The further coils L1, L2, and L4 are arranged in a manner similar to the coil L3 wherein the coils L1, L2, L4 which are arranged in the bearing 6a, are wound in senses opposite to the coils L1, L2, L4 arranged in the bearing 6b. The two coils L1 and the two coils L2 and the two coils L4 are in each case connected in series. This arrangement can be connected to the rotary current controller 10 in a manner illustrated in FIG. 2b, with the coils L1, L2, L3, L4 which are illustrated in FIG. 2b, corresponding in each case to the series connection of two coils L1, L2, L3, L4 in accordance with FIG. 4. Thus, a unipolar bearing such as is illustrated in the FIGS. 4, 5, and 6 can be operated with a single rotary current controller 10. The shaft 1, which is arranged between the two bearings 6a, 6b, can also be designed to be very short so that the two bearings 6a, 6b are arranged adjacently with only a very slight spacing.

Figure 8A:
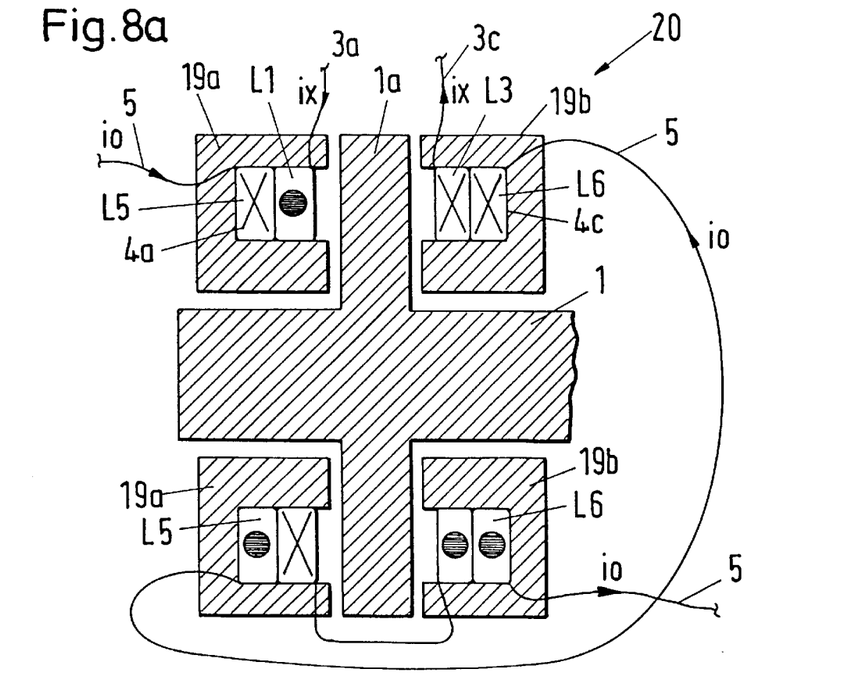
FIGS. 8a and 8b are exemplary embodiments of a bearing apparatus which can be excited additionally in the axial direction.
Figure 8B:
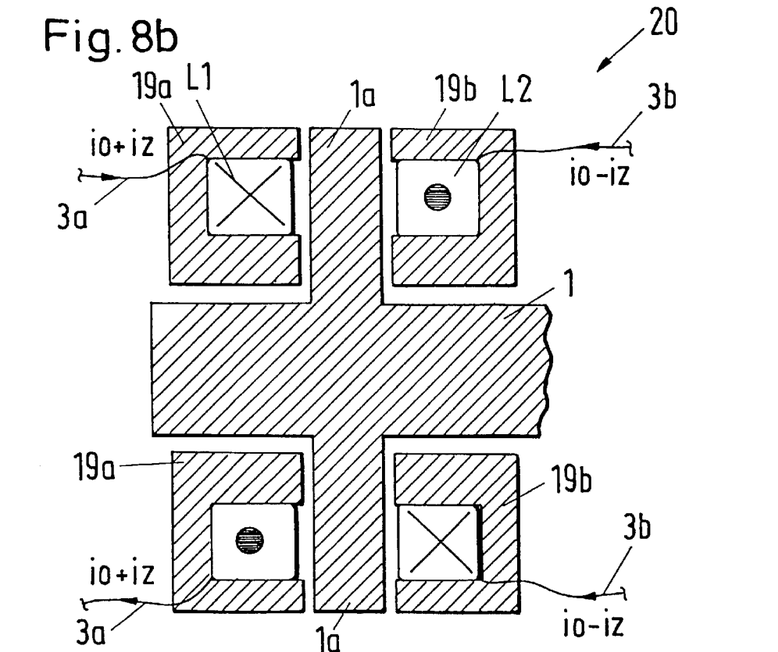
Figure 8C:
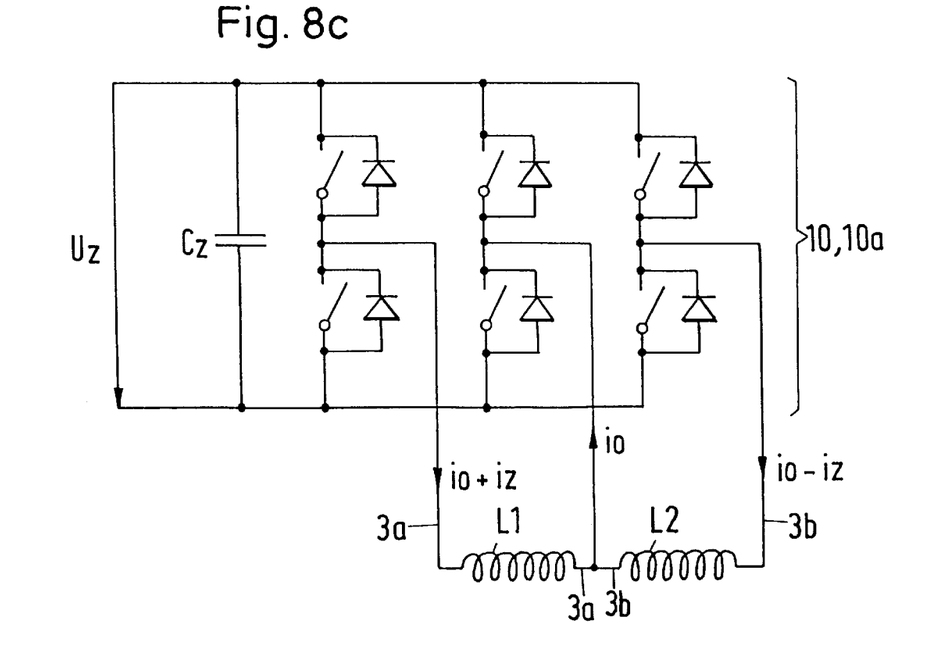

FIGS. 8a, 8b show an active magnetic bearing 20 which can form a constituent of the radial, active magnetic bearing apparatus. The shaft 1 which is held by the radial magnetic bearing 6 enters at its end into the axial bearing 20. The shaft 1 has disc-shaped part 1a which is arranged to lie between two electromagnets 19a, 19b. The electromagnets 19a, 19b are designed in the form of a circle and are arranged with a radial spacing with respect to the shaft 1. Corresponding to the current flowing in the coils L1, L2, L3, a magnetic force is produced which acts on the disc-shaped part 1a and extends in the axial direction. Thus, the position of the shaft 1 in the axial direction can be controlled by the axial bearing 20. In the exemplary embodiment of FIG. 5b, each electromagnet 19a, 19b has a coil L1, L2, wound in the peripheral direction of the shaft 1. The coils L1, L2 are, as illustrated in FIG. 8c, excited by a three-phase rotary current controller 10, 10a, with a current io+iz flowing to the coil L1 via the lead 3a, whereas a current io−iz flows to the coil L2 via the lead 3b. The current iz is modulated by the rotary current controller 10, 10a and can take on positive or negative values so that the shaft 1 can be displaced to both sides in the axial direction by the forces produced by the axial bearing 90. In the exemplary embodiment of FIG. 8a, the electromagnet 19a has two coils L1, L5 which are wound to extend in the peripheral direction of the shaft 1. The coil L5 is flowed through by a constant current io via the lead 5 whereas the coil L1 is flowed through by a variable current ix via the lead 3a. The electromagnet 19b likewise has two coils L3, L6, with the coil L6 being connected in series with the coil L5 and thus likewise being flowed through by the constant current io. The coil L3 is connected in series with the coil L1 and is thus likewise flowed through by the variable current ix. An advantage of the arrangement in accordance with FIG. 8 is to be seen in the fact that two axial bearings can be operated independently of one another with a single rotary current controller 10 through the arrangement of the coils L1, L3, L5, L6. If the axial bearing 20 is excited by an electric circuit in accordance with FIG. 2b, then the coils L1, L3 are flowed through in series by the current ix as illustrated in FIG. 2b. The current ix can be predetermined by the rotary current controller 10 so that the axial bearing 20 can be excited. In the second current path iy of the rotary current controller 10, with incoming lead 3d and outgoing lead 3b, a second axial bearing 20 can be operated which is designed identically to the embodiment in accordance with FIG. 5a. The current iy can be predetermined by the rotary current controller 10. The currents ix and iy can be predetermined independently of one another so that two axial bearings 20 can be excited independently of one another with a single rotary current controller 10. These two axial bearings 20 can be arranged at two different shafts 1. In this way, the axial position of two shafts 1 can be controlled independently of one another with a single rotary current controller 10.

What is claimed is:

1. A radial, active magnetic Maxwell-bearing apparatus comprising at least three electromagnets which are distributedly arranged, wherein said apparatus further comprises:

a three-phase rotary current controller for supplying a current to the electromagnets;

a position sensor for measuring the position of the rotor in two radial directions; and a programmable microprocessor, wherein the microprocessor stores a desired value of the position of the rotor in two directions, calculates control deviations in two directions, calculates desired current values for the three-phase rotary current controller by a two- to three-phase transformation, and provides the calculated current values to the three-phase rotary current controller so that the electromagnets are supplied with current in such a manner that the position of the rotor corresponds to the desired value stored, and wherein the current supplied to each electromagnet is dependent upon the current supplied to the other electromagnets.

2. A magnetic Maxwell-bearing apparatus in accordance with claim 1, wherein the electromagnets are of discrete design.

3. A magnetic Maxwell-bearing apparatus in accordance with claim 2, wherein three electromagnets are respectively mutually displaced in the peripheral direction by 120°.

4. A magnetic Maxwell-bearing apparatus in accordance with claim 2, wherein four electromagnets are respectively mutually displaced in the peripheral direction by 90°.

5. A magnetic Maxwell-bearing apparatus in accordance with claim 2, wherein six electromagnets are respectively mutually displaced in the peripheral direction by 60°.

6. A magnetic Maxwell-bearing apparatus in accordance with claim 1, wherein the electromagnets are designed as a rotary field machine stator with a three-phase winding.

7. A magnetic Maxwell-bearing apparatus in accordance with claim 1, wherein at least one additional coil or a permanent magnet is arranged for the production of a bias magnetization.

8. A magnetic Maxwell-bearing apparatus in accordance with claim 1, wherein the coils of the electromagnets are connected to the rotary current controller in a star or delta circuit.

9. A method of operation of a magnetic Maxwell-bearing apparatus, the method comprising:

providing a magnetic Maxwell-bearing apparatus comprising at least three electromagnets which are distributedly arranged, wherein a three-phase rotary current controller is provided for supplying a current to the electromagnets, wherein the current supplied to each electromagnet is dependent on the current supplied to the other electromagnets;

predetermining a position of the rotor in an x-direction and in a y-direction by a desired value;

measuring a position of the rotor by a position sensor in a x-direction and a y-direction;

calculating control deviations in the x-direction and in the y-direction;

calculating desired current values by a two- to three-phase transformation for a three-phase rotary current controller; and providing the calculated desired current values to the three-phase rotary current controller so that the coils of the electromagnets are supplied with current in such a manner that the position of the rotor corresponds to the predetermined desired value.

* * * * *